United States Patent [19]

Vejchoda

[11] Patent Number: 5,503,505
[45] Date of Patent: Apr. 2, 1996

[54] AIR CONVEYOR WITH FLOATING COVERS

[75] Inventor: Miroslav W. Vejchoda, Downers Grove, Ill.

[73] Assignee: Fleetwood Systems, Inc., Romeoville, Ill.

[21] Appl. No.: 226,884

[22] Filed: Apr. 13, 1994

[51] Int. Cl.$^6$ .................................................. B65G 51/03
[52] U.S. Cl. ............................................................. 406/88
[58] Field of Search ................................ 406/86, 87, 88

[56] References Cited

U.S. PATENT DOCUMENTS

| | | | |
|---|---|---|---|
| 4,561,806 | 12/1985 | Lenhart | 406/88 |
| 4,730,956 | 3/1988 | Lenhart | 406/88 |
| 4,828,434 | 5/1989 | Fairman et al. | 406/88 |
| 5,129,765 | 7/1992 | Smith et al. | 406/88 |
| 5,299,890 | 4/1994 | Spatafora | 406/88 |

*Primary Examiner*—Gary C. Hoge
*Attorney, Agent, or Firm*—Trexler, Bushnell, Giangiorgi & Blackstone

[57] ABSTRACT

An improved air conveyor for conveying a plurality of articles such as cans in an upright orientation between stations in a multi-step process includes an elongate deck having a plurality of openings for directing air upwardly and in a direction in which articles are to be conveyed and guides mounted to opposite lateral sides of the deck for maintaining articles upon the deck while being conveyed thereover. A top cover assembly includes at least one perforated panel vertically spaced above the deck and extending over an area substantially similar to the area defined by the deck. A plurality of cover panels overlie the perforated panel. Retaining structures maintain the cover panels substantially in place laterally while permitting movement thereof toward and away from the perforated panel for regulating air flow through portions of the perforated panel in response to variations in air pressure beneath the perforated panel.

19 Claims, 2 Drawing Sheets

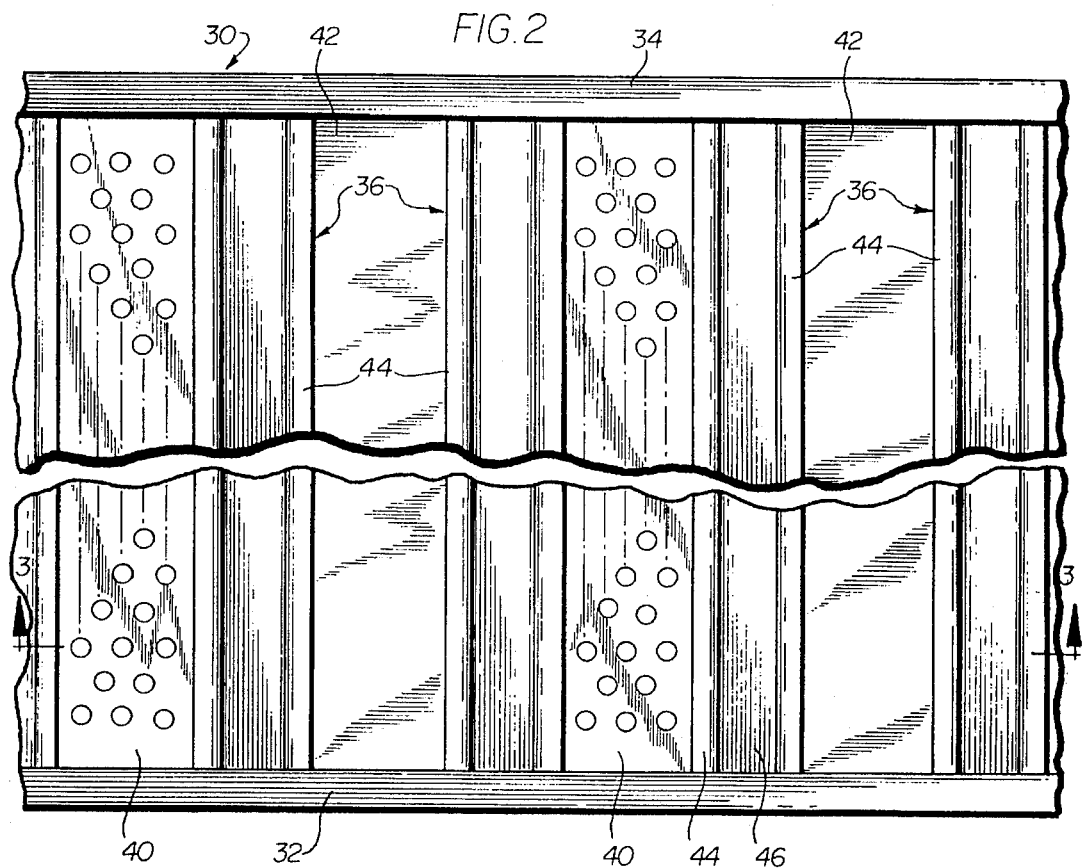
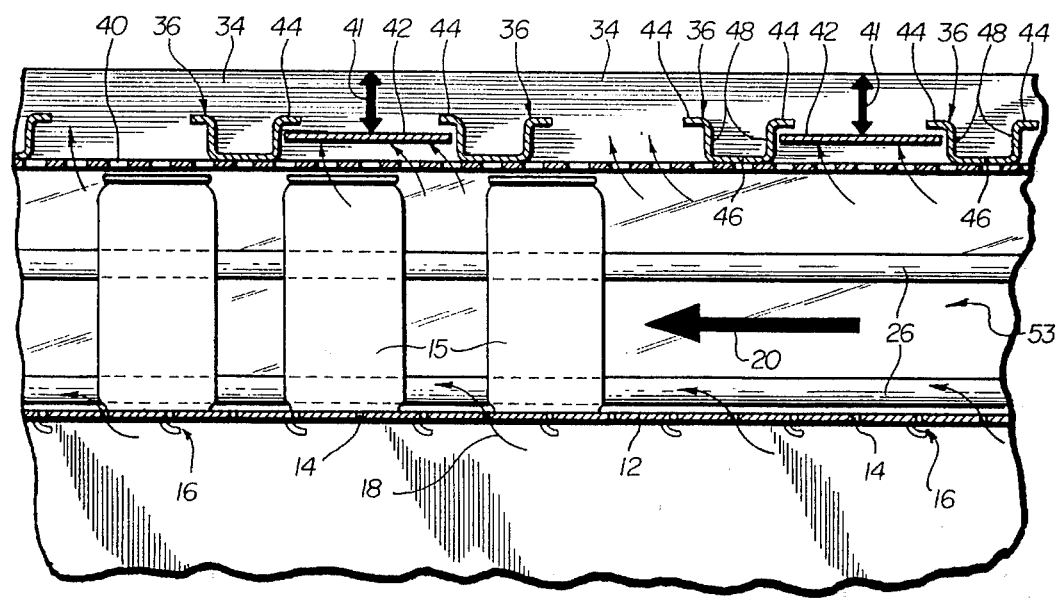

AIR CONVEYOR WITH FLOATING COVERS

BACKGROUND OF THE INVENTION

This invention concerns a novel and improved conveyor apparatus for conveying articles such as beverage or food cans, or other similar containers in an upright orientation, between stations in a multi-step process. The invention more particularly concerns an air conveyor with floating covers for regulating the air pressure within the conveyor apparatus.

Air conveyors have heretofore been utilized for conveying containers such as empty beverage cans between stations in a multi-step process. The cans might be conveyed for example between stations wherein the cans are initially formed to stations wherein the cans are coated in some instances with appropriate protective materials, or wherein the cans have various labels painted or otherwise applied thereupon, as well as other printed identifying marks or the like applied thereto. Finally, the cans must be conveyed to a filling operation.

These air conveyors generally comprise relatively wide, elongated elevated platforms or decks which are provided with a plurality of perforations or openings through which air is directed. Generally speaking, the perforations or openings are appropriately shaped for directing air primarily in the direction in which the cans or other containers or articles are to be conveyed. It has been found that the force of the air impinging upon the individual containers varies as a function of the number of containers which are present over a given surface area of the deck at any given time. Thus, where many containers are present, many of the openings in the deck may be blocked, causing the air to exit with somewhat greater force in the remaining unblocked openings. This increased force can in turn drive individual containers or cans at a somewhat higher velocity into preceding containers. If the force or velocity with which individual containers are propelled becomes too high, the containers may damage each other upon collision, or otherwise scrape or mar the paint or labels or other identifying information or decorative surfaces which have been applied thereto. Particularly, in the case of relatively thin-walled aluminum beverage cans and the like, some denting or deformation of the cylindrical side walls of the respective cans can occur upon collision, as the force or velocity of the individual cans increases, as well as damage to any paint finishes or surfaces which have previously been applied thereto.

Generally speaking, such creation of damaged or reject containers is to be avoided during such handling and conveying operations wherever possible, to assure that subsequent filling and handling steps can take place as expeditiously as possible, without the need for operator intervention.

The present invention specifically improves upon an air conveyor apparatus which includes a deck as described above, a top or upper surface comprising a perforated panel, and appropriate supports for maintaining the top panel spaced by a desired vertical distance from the deck. This vertical distance is generally slightly greater than the vertical height of the containers to be conveyed through the apparatus, so as to permit the containers to slide with relative ease between the deck and the top, and yet prevent the containers from tipping or tilting while being conveyed. The lateral sides of the conveyor between the lateral edges of the deck and top were heretofore provided with one or more elongated guide rails running substantially the length of the deck. The sides were otherwise left open. This was done in order to minimize the pressure buildup within the air conveyor apparatus. It was heretofore believed that any pressure buildup would only further contribute to excessive forces applied to, and velocities being attained by, the individual articles, and hence increase the incidence of damage thereto.

Surprisingly, it has been found in connection with the present invention, that a regulated amount of pressure buildup within the air conveyor apparatus may in fact have desirable rather than deleterious effects. For example, it has been found that a slightly elevated pressure tends to create an air cushion between individual articles such as cans or other containers, thus reducing the tendency of the articles to forcibly impinge on one another and cause damage. In addition, maintaining a regulated amount of pressure within the conveyor apparatus produces more of a "floating" effect, which together with the air cushion effect just mentioned tends to convey the articles more gently and avoid forceful impingement therebetween of the sort leading to the damaged articles.

OBJECTS AND SUMMARY OF THE INVENTION

Accordingly, it is general object of this invention to provide a novel and improved air conveyor which regulates air pressure within the conveyor to create an air cushion between respective articles being conveyed.

A related object is to provide an improved air conveyor which is provided with structure for regulating internal air pressure to compensate for differences in air flow and/or pressure due to the presence of greater or fewer numbers of articles from one area to another area within the conveyor apparatus.

Briefly, and in accordance with the foregoing objects, the present invention envisions an improved air conveyor for conveying a plurality of articles such as cans in an upright orientation between stations in a multi-step process. The air conveyor includes an elongate deck having a plurality of openings for directing air upwardly and in a direction in which the articles are to be conveyed. Guards are mounted to opposite lateral sides of the deck for maintaining the articles upon the deck while being conveyed thereover. A top cover assembly of the air conveyor includes at least one perforated panel vertically spaced above the deck and extending over an area substantially similar to the area defined by the deck. A plurality of cover panels overlies the perforated panels and a retaining structure is provided for maintaining the cover panels substantially in place laterally while permitting movement thereof toward and away from the perforated panel for regulating air flow through portions of the perforated panel in response to variations in air pressure beneath said perforated panel.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 2 is a partial top plan view of the air conveyor of the invention;

FIG. 3 is a sectional view, taken generally along the line 3—3 of FIG. 2;

DETAILED DESCRIPTION OF THE ILLUSTRATED EMBODIMENT

Figure 1:
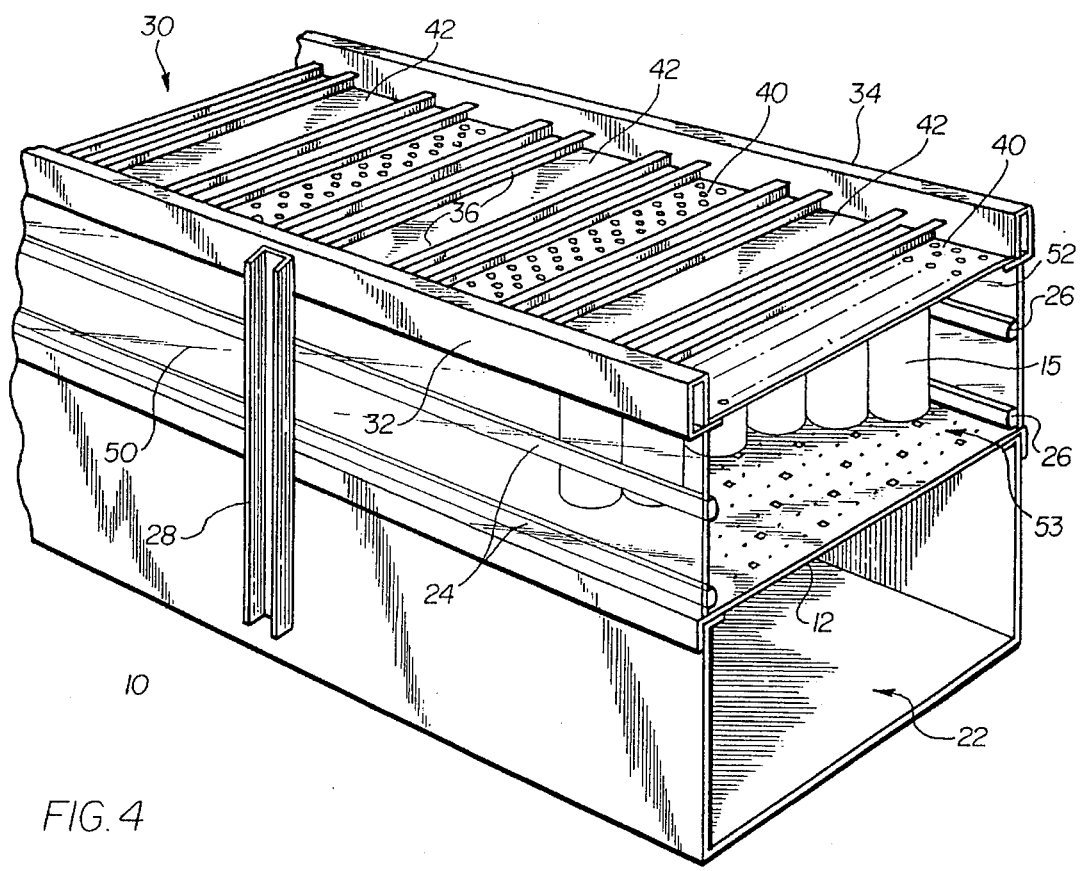
FIG. 1 is a partial perspective view of an improved air conveyor in accordance with the invention.
Figure 4:
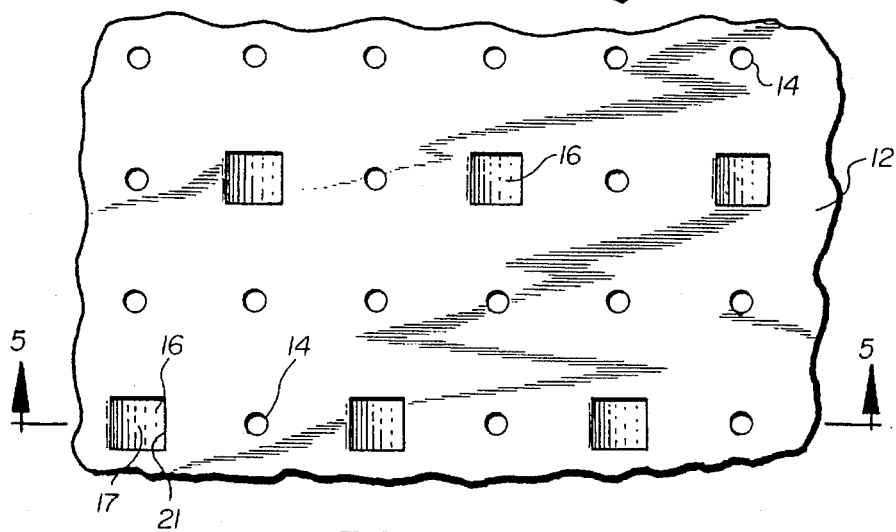
FIG. 4 is an enlarged fragmentary view of a deck portion of the air conveyor of the invention.
Figure 5:
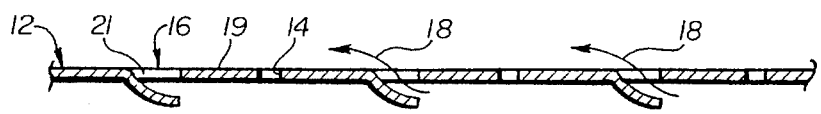
FIG. 5 is a sectional view, taken generally along the line 5—5 of FIG. 4.

Referring now to the drawings, and initially to FIGS. 1–3, there is shown a novel and improved air conveyor for conveying a plurality of articles such as cans 15 in an upright condition or orientation, and designated generally by the reference numeral 10. The air conveyor 10 includes an elongate deck 12 which as best viewed in FIGS. 4 and 5 has a plurality of openings 14, 16 for directing air upwardly and in a direction in which the articles or cans 15 are to be conveyed. In this regard, openings 14 are generally circular through openings for directing air upwardly, whereas opening 16 comprise "lances", that is, cut-out portions of the surface of the panel forming the deck 12, which are displaced below a surface 19 of the deck 12. Formation of the fingers 17 results in apertures 21 in the deck 12. The lances 16 direct air in a generally upward and lateral direction as indicated by arrows 18 in FIG. 5. The panel forming the deck 12 is oriented such that this direction 18 is coincident with the desired direction of travel of the articles or cans 15 with respect to the conveyor 10. This direction of travel is also indicated by the arrow 20 in FIG. 3.

Briefly, the deck 12 is mounted over the top of an elongate duct or plenum 22 which carries air supplied from an appropriate fan or blower (not shown). Elongate guard means or guard rails 24, 26 are mounted to opposite sides of the conveyor above the deck 12 for maintaining the articles or cans 15 upon the deck while being conveyed thereover. These guide rails 24, 26 may be mounted to suitable upright support members such as support 28 which is in turn affixed to a side of the plenum or duct 22.

A top cover assembly 30 includes a pair of elongate lateral support beams or members 32, 34 which may also be supported a pre-selected distance above the deck 12 by the vertical struts or support members 28. These beams 32, 34 support therebetween a top cover assembly 30 including a plurality of spaced-apart transversely extending parallel support members 36 which in turn are attached to and support a relatively thin flat perforated panel 40. The perforated panel 40 is generally of the same dimensions as the deck 12 and is parallel to and spaced above the deck 12. The vertical position or spacing of the panel 40 above deck 12 is generally determined by the point at which the support beams 32, 34 are mounted relative to the uprights 28. An adjustable mounting arrangement (not shown) may be utilized in this regard to adjust the height of the panel 40 above the deck 12 so as to accommodate articles or cans 15 of varying heights. Preferably, the height of panel 40 above deck 12 is slightly greater than the height of the articles 15 to allow the articles 15 to slide freely therebetween while preventing the articles 15 from tipping over.

In accordance with a feature of the invention, a plurality of cover panels 42 are provided overlying at least portions of the perforated panel 40. In the illustrated embodiment, these cover panels 42 are retained intermediate at least selected pairs of adjacent ones of the support members 36.

In this regard, retaining means are provided for maintaining the solid panels 42 substantially in place laterally (e.g., intermediate selected pairs of these support members 36) while permitting movement of the panels 42 toward and away from the perforated panel for regulating air flow through portions of the perforated panel in response to variations in the air pressure beneath the perforated panel 40. In the illustrated embodiment, the retaining means comprise oppositely outwardly directing flange members or portions 44 formed on the respective support members 36, as indicated generally by the bi-ended arrows 41.

As discussed hereinabove, such variations in air pressure may occur due to the presence of fewer or more articles or cans 15 upon various areas of the top surface of the deck 12. Generally speaking, the articles or cans 15 sometimes tend to accumulate or bunch up toward an exit or outlet end of the conveyor 10 prior to being accepted by following equipment. The articles or cans 15 tend to enter an opposite or entrance end of the conveyor 10 individually or in random groupings as they are supplied from upstream equipment.

In the preferred form of the invention illustrated herein, and as best viewed in FIGS. 1 and 3, side walls or panels 50, 52 are preferably affixed to the guide rails 24 and 26 respectively. These side panels 50, 52 extend both vertically and longitudinally over a substantial portion of the area between the deck 12 and the perforated panel 40, so as to substantially enclose the articles or cans 15 in a chamber 53 defined therebetween. In the illustrated embodiment, the side panels 50, 52 are preferably fabricated from a transparent material such as a durable plastics material. The side panels 50, 52 serve to minimize the escape of air at the sides of the conveyor 10 to thereby further enhance the regulation of pressure by the action of the cover panels 42 relative to the perforated panel 40 as described hereinabove.

Preferably, each of the support members 36 comprises an elongate generally U-shaped channel having a base web or base portion 46 which is connected to the perforated panel 40 for example by welding or the like. A pair of spaced-apart legs or further web portions 48 extend upwardly to opposite lateral sides of the web or base portion 46. The flange members or portions 44 extend oppositely outwardly from these legs or upwardly extending web portions 48 in a generally parallel spaced condition relative to the base web portion 46. The spacing of the flange portions 44 above the web portion 48 is considerably greater than the thickness of the cover panels 42 to permit vertical motion thereof as indicated generally by arrows 41 in FIG. 3. Stated another way, the upward extent of the legs 48 of the support members 36 is greater than the thickness of the cover panels 42.

Cooperatively, the cover panels 42 are of a predetermined width such that they are retained under the flange members 44 of respective adjacent ones of support members 36 when the panels 42 are in an undeformed condition. Preferably, the length of the panels 42 is substantially similar to the width of the air conveyor intermediate the side support or beam members 32, 34. This width is also preferably similar to the width of the perforated panel 40. Moreover, the cover panels 42 are preferably relatively thin flat members such that they may be elastically deformed or flexed to an extent sufficient to permit their insertion and/or removal relative to the flange members 44 of respective adjacent support members 36.

It should be recognized that other specific constructions and configurations of the support members 36 and the cover panels 42 may be employed without departing from the invention, for maintaining the equivalent function to that of the structure described hereinabove.

In operation, then, the cover panels 42 are relatively loosely held overlying selected sections of the perforated panel 40, by the action of the flange portions 44 of support members 36. As best viewed in FIG. 3, these panels 42 are free to move in a generally vertical direction in response to variations in the pressure and air flow in the chamber defined below perforated panel 40, generally by the side panels 50, 52 and the deck 12. This "floating" action of the panels 42 serves to help regulate the pressure from area to area along the length of the air conveyor in order to essentially maintain a cushion of air upon which the articles or cans 15 are carried or propelled. This cushion of air is such that some air pressure will build up between articles or cans which are rapidly approaching preceding articles or cans within the conveyor, thus slowing the overtaking articles and preventing damaging impacts therebetween.

However, this regulation of pressure will allow the pressure to be relieved to the extent necessary to permit continued flow of articles along the conveyor in the direction 20 as illustrated in FIG. 3. Thus, while the articles or cans may tend to accumulate or bunch up toward an outlet end of the air conveyor, individual articles will initially join or combine with the group or bunch of articles with a decreased velocity so as to minimize the force of impact and prevent damage to the individual cans or articles. The provision of the movable cover panels 42 and of the solid side panels 50, 52 permits the regulation of air pressure for achieving this type of operation.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An improved air conveyor for conveying a plurality of articles in an upright orientation between stations in a multi-step process; said air conveyor comprising: an elongate deck having a plurality of openings for directing air upwardly; guides mounted to opposite lateral sides of said deck for maintaining said articles upon said deck while being conveyed thereover; a top cover assembly including at least one perforated panel vertically spaced above said deck and extending over an area substantially similar to the area defined by said deck; a plurality of cover panels overlying said perforated panel; and retainers for maintaining said cover panels substantially in place horizontally while permitting movement thereof vertically toward and away from said perforated panel for regulating air flow upwardly through portions of said perforated panel in response to variations in air pressure beneath said perforated panel.

2. An improved air conveyor according to claim 1 and further including side panels affixed to said guides and extending vertically and longitudinally over a substantial portion of the area between said deck and said perforated panel at outer lateral edges thereof.

3. An improved air conveyor according to claim 1 wherein said top cover assembly further includes a plurality of parallel and spaced-apart extending transversely across and supporting said perforated panel in a position vertically spaced above said deck; wherein said retainers comprise oppositely outwardly directed flanges formed on each of said supports, and wherein said cover panels are configured for interfitting between selected pairs of said supports with said flanges overlying opposite edge portions of said cover panels.

4. An improved air conveyor according to claim 3 wherein each of said supports comprises an elongate generally U-shaped channel, having a web portion connected to said perforated panel, a pair of spaced apart legs extending upwardly from said web portion, and said flanges extending oppositely outwardly from respective ones of said legs at locations spaced apart from said web portion.

5. An improved air conveyor according to claim 3 wherein said cover panels have a predetermined thickness and wherein said flanges are vertically spaced above said perforated panel by a distance greater than the thickness of said cover panels.

6. An improved air conveyor according to claim 4 wherein the upward extent of said legs of said supports is greater than the thickness of said cover panels.

7. An improved air conveyor according to claim 3 wherein said cover panels are of a predetermined width selected such that they are retained under said flanges when in an undeformed condition.

8. An improved air conveyor according to claim 3 wherein said cover panels are relatively thin flat members, such that they may be deformed to an extent sufficient to permit insertion and removal thereof relative to said flange members.

9. An improved air conveyor according to claim 1 wherein said perforated panel has a predetermined width and wherein said cover panels have a length dimension no greater than said predetermined width of said perforated panel.

10. A method of conveying a plurality of articles in an upright orientation between stations; said method comprising the steps of: providing an elongate deck having a plurality of openings for directing air upwardly and in a direction in which articles are to be conveyed; providing guides along the opposite lateral sides of said deck for maintaining said articles upon said deck while being conveyed; providing a top cover assembly including perforated portions vertically spaced above said deck and extending over an area substantially coextensive to the area defined by said deck; and providing a plurality of cover panels to overlie at least portions of said perforated panel and said step of providing said cover panels further includes the step of providing retainers for maintaining said cover panels substantially in place laterally while permitting relative movement thereof toward and away from said perforated panel for regulating the air flow though portions of said perforated panel in response to variations in air pressure beneath the perforated panel; selectively placing and removing said cover panels in response to the need to regulate air flow.

11. An air conveyor for conveying a plurality of articles between process stations: said air conveyor including a deck having a plurality of openings for directing air therethrough, sides and a top perforated cover assembly defining a chamber, said air conveyor comprising:

a plurality of cover panels overlying said perforated top cover assembly for regulating air flow upwardly through portions of said perforated top cover assembly in response to variations in air pressure in said chamber, to provide an air cushion which serves to prevent damage to the articles being conveyed; and retainers for maintaining said cover panels substantially in place horizontally while permitting movement thereof vertically toward and away from said perforated top cover assembly under the influence of air exhausted upwardly through said perforated top cover assembly.

12. An air conveyor for conveying a plurality of articles between process stations; said air conveyor including a deck having a plurality of openings for directing air therethrough, sides and a top perforated cover assembly defining a chamber, said air conveyor comprising:

a plurality of cover panels overlying said perforated top cover assembly for regulating air flow upwardly through portions of said perforated top cover assembly in response to variations in air pressure in said chamber, to provide an air cushion which serves to prevent damage to the articles being conveyed: and said top cover assembly including a plurality of parallel and spaced apart retainers extending transversely across and supporting said perforated panel in a position vertically spaced above said deck and;

said retainers having oppositely outwardly directed flanges formed on each of said retainers and said cover panels being configured for interfitting between selected pairs of said retainers with said flanges overlying opposite edge portions of said cover panels.

13. An air conveyor according to claim 12, comprising:

each of said retainers comprising an elongate generally U-shaped channel having a web portion connected to said perforated panel, a pair of spaced apart legs extending upwardly from said web portion, and said flanges extending oppositely outwardly from respective ones of said legs at locations spaced apart from said web portion.

14. An air conveyor according to claim 13, comprising:

the upward extent of said legs of said retainers being greater than a predetermined thickness of said cover panels.

15. An air conveyor according to claim 12, comprising:

said cover panels having a predetermined thickness and said flanges being vertically spaced above said perforated panel by a distance greater than said predetermined thickness of said cover panels.

16. An air conveyor according to claim 12, comprising;

said cover panels are relatively thin flat members, said cover panels being deformable to an extent sufficient to permit insertion and removal thereof relative to said flange members.

17. An air conveyor for conveying a plurality of articles between process stations; said air conveyor including a deck having a plurality of openings for directing air therethrough, sides and a perforated top panel defining a chamber, said air conveyor comprising:

a plurality of cover panels overlying said perforated top panel for regulating air flow upwardly through portions of said conveyor in response to variations in air pressure in said chamber and for providing an air cushion which prevents damage to articles being conveyed;

support members positioned on said perforated top panel at spaced apart locations, each of said cover panels being retained between a pair of said support members and a portion of said perforated top panel; and said support members having a predetermined dimension therebetween and said cover panels having a predetermined shape and dimension, said dimension of said cover panels being smaller than said dimension between said support members to allow air exhausted through said perforated top panel to escape around said cover panels to float said cover panels over said perforated top panel on said exhausted air.

18. A method of conveying a plurality of articles between processing stations, said method including providing a deck having a plurality of openings for directing air therethrough for the movement of articles along said deck, providing sides and a perforated top cover assembly defining a chamber with said deck for retaining the articles to be conveyed, providing a plurality of cover panels to overlie at least a portion of said perforated top cover assembly; providing retainers for maintaining said cover panels in position controlling and restricting the flow of air from said chamber through said perforated top cover assembly by floating said cover panels toward and away from said perforated panel under the influence of air exhausted through said perforated panel, thereby providing back pressure on said air exhausted through said perforated panel and providing an air cushion in said chamber.

19. A method of conveying articles between stations, said method comprising the steps of:

providing a deck having a plurality of apertures for directing air relative thereto and guides for maintaining said articles on said deck;

providing a top cover assembly spaced from said deck, said cover assembly including perforated portions and a plurality of moveable cover panels retained relative to said perforated portions;

forcing air through said apertures in said deck to provide an air conveyor for moving said articles relative to said deck;

exhausting air forced through said apertures in said deck through said perforated portions;

regulating said exhausted air flow through said perforated portion by moving said moveable cover panels toward and away from said perforated portions.

* * * * *

UNITED STATES PATENT AND TRADEMARK OFFICE
CERTIFICATE OF CORRECTION

PATENT NO. : 5,503,505
DATED : April 2, 1996
INVENTOR(S) : Miroslav W. Vejchoda

It is certified that error appears in the above-indentified patent and that said Letters Patent is hereby corrected as shown below:

Column 5, Line 67  "spaced-apart extending"  should read
— spaced-apart supports extending —

Signed and Sealed this

Seventeenth Day of September, 1996

Attest:

BRUCE LEHMAN

Attesting Officer    Commissioner of Patents and Trademarks